TUNED STABLE LASER IN A COMMUNICATION SYSTEM

Filed Aug. 16, 1965 4 Sheets-Sheet 1

INVENTOR
FRANCIS E. GOODWIN
BY J. K. Haskell
ATTORNEY.

INVENTOR.
FRANCIS E. GOODWIN,
BY J. K. Haskell
ATTORNEY.

TUNED STABLE LASER IN A COMMUNICATION SYSTEM

Filed Aug. 16, 1965 4 Sheets-Sheet 3

INVENTOR.
FRANCIS E. GOODWIN,
BY J. K. Haskell
ATTORNEY.

INVENTOR.
FRANCIS E. GOODWIN
BY J. K. Haskell
ATTORNEY

United States Patent Office 3,482,099
Patented Dec. 2, 1969

3,482,099
TUNED STABLE LASER IN A COMMUNICATION SYSTEM

Francis E. Goodwin, Malibu, Calif., assignor to Hughes Aircraft Company, Culver City, Calif., a corporation of Delaware Filed Aug. 16, 1965, Ser. No. 479,952
Int. Cl. H04b *9/00*
U.S. Cl. 250—199 15 Claims

ABSTRACT OF THE DISCLOSURE

In the disclosed laser communication system an information-containing laser beam is transmitted toward a receiver. The receiver includes a laser whose output consists of two superimposed local oscillator beams each of whose frequency differs from the frequency of the information-containing beam by the same amount. This frequency difference is substantially equal to the sum of the Doppler frequency shift of a laser beam (transmitted between the receiver and transmitter) and a predetermined intermediate frequency. The two local oscillator beams may be generated by either subjecting a gaseous laser medium to a magnetic field according to the Zeeman effect or by employing two laser cavities of different lengths. One of the local oscillator beams is mixed with the information-containing beam; the resultant beam is then demodulated. The other local oscillator beam is directed toward the transmitter where it is mixed with a portion of the transmitted information-containing beam, the mixed beam being employed to stabilize the transmitting laser.

The present invention relates to lasers and more particularly to tuned stable lasers which are particularly adapted to provide Doppler compensation in a laser communication system.

The need to communicate with a fast moving spacecraft traveling at extremely great distances from earth has created very complex communication problems which designers have attempted to overcome with equally complex systems. Since at the present state of space exploration, the power output of the signal transmitter in the spacecraft is quite limited, when the craft is very far from earth, the received signals are extremely small, often being indistinguishable from superimposed noise signals produced by extraneous noise sources. Designers have attempted to alleviate this problem by developing highly stable low noise ground receiving systems in order to minimize the number of potential noise sources and increase the signal-to-noise ratio.

Communicating with a spacecraft is further complicated by the fact that the craft is constantly in motion. This produces Doppler shifts in the frequencies of the signals transmitted to and from the spacecraft. Furthermore, whenever the spacecraft is in a selected orbit, the relative magnitude and direction of the velocity of the craft varies with respect to the ground receiving station, thus resulting in continuously varying Doppler shifts which must be compensated for. The circuitry needed to provide for such compensation is quite complex and generally introduces a substantial amount of additional noise, further complicating the interpretation of the received signals.

The development of laser technology, whereby high purity signals in the optical frequency range are produced, has stimulated the interest of using lasers for space communication. Herebefore, it has been proposed to use lasers as the sources of extremely high frequency carrier signals which are conventionally provided in communication systems by radio frequency (RF) oscillators. Optical signals have the extraordinary ability to be collimated into a very narrow beam and thus are very efficient for long-range communications. Conventional present-day usage employs straight quantum detection, an insensitive mode of detection. Optical heterodyne detection is an extremely sensitive receiving technique having the ability to detect single light quanta in some cases. In addition, optical heterodyning preserves frequency selectivity and Doppler information, which is lost in straight quantum detection. In all previously proposed systems, the function of the laser has been limited to provide heterodyne or low-noise detection of signals at a fixed stable frequency with Doppler shift compensation to be accomplished in other parts of the system. Thus, herebefore, lasers have not been employed to provide Doppler shift compensation and thereby simplify the communication system, as to improve the sensitivity of the detector.

Accordingly, it is an object of the present invention to provide a novel communication system.

Another object is the provision of a new improved laser communication system.

A further object is to provide a new communication system in which a laser is utilized to provide high purity optical signals at a controllable frequency.

Still a further object is to provide a laser communication system in which the frequency of the signals produced by the laser is automatically adjusted to compensate for Doppler shifts.

Yet, another object of the invention is to provide a heterodyne type laser communication system in which the output frequency of the laser is continuously adjustable to compensate for varying Doppler shifts produced by a fast moving communication system.

Yet a further object is to provide a novel double-ended heterodyne type laser communication system wherein the two output frequencies of a laser are used for bilateral or two-way Doppler shift compensation.

These and other objects of the invention are achieved by providing a communication system in which a laser is used to provide a stable controllably variable frequency which is a function of the carrier frequency of the system and the varying Doppler shifts produced therein, so that the frequency provided by the laser automatically accounts or compensates for Doppler shifts. Thus, the need for electronic Doppler shift compensation circuitry external to the laser is eliminated thereby greatly reducing complexity.

Briefly in one embodiment, the teachings of the present invention are employed in a heterodyne type communication system in which the received signal frequency containing information is mixed with a locally generated frequency to provide an intermediate frequency (IF) from which information is extracted. In a conventional heterodyne system, the locally generated frequency is provided by a local radio frequency (RF) oscillator. The generated frequency is either higher or lower than the received frequency by the intermediate frequency. If the received frequency varies due to Doppler shifts, the frequency of the RF is changed to compensate for such variations. This conversion of the RF frequencies to the IF frequencies is accomplished in a section known in the art as the converter-oscillator or mixer section, also referred to as the first detector section.

In accordance with the teachings of the present invention, the function of the local RF oscillator is performed by a stable laser. The frequency of the beam is variable so that it is at all times related to the received frequency which is subject to Doppler shift.

As the received signal frequency is changed to Doppler shifts, the frequency of the beam produced by the laser changes by an equal amount, so that the two frequencies can be directly mixed to provide the intermediate frequency from which information is extracted. The frequency of the beam is varied by means of a magnetic field superimposed on the laser which affects the frequency due to the Zeeman effect. Briefly the Zeeman effect produces a change in the laser's emitted light by subjecting the source of light radiation to a magnetic field. By controlling the intensity of the magnetic field, the change or shift in the output frequency of the laser's beam is controlled. As is appreciated by those familiar with stable lasers, in order to produce a coherent light beam, the laser cavity must be tuned as a function of the emitted frequency. Therefore, in accordance with the teachings of the present invention, in addition to controlling the intensity of the magnetic field, so that the frequency of the laser's beam relates to the received frequency as modified by the Doppler shifts, the system also includes means for resonating or tuning the cavity to the desired frequency so that a coherent output is produced. Thus, the laser produces a coherent output, the frequency of which is related to the received frequency as modified by the Doppler shifts, thereby eliminating the need for electronic Doppler compensating circuitry external to the laser. As a result, the system is simplified appreciably and the complexity in the radio-frequency section of the system is greatly reduced.

In another embodiment of the invention, a novel arrangement is employed in the laser's cavity so that two coherent light beams of different polarization characteristics are produced simultaneously. The beams' frequencies are higher and lower than a predetermined frequency by an equal amount. One of the beams is combined with the received signal frequency or beam from the spacecraft while the other is used to transmit information to the craft. The frequency of the latter beam is such that when the beam arrives at the spacecraft, its frequency is shifted by Doppler shifts so that it can be combined directly with a beam from a fixed stable laser, without the need for Doppler compensation in the spacecraft. This is particularly significant in the present state of the art since it eliminates the need for Doppler compensation in the spacecraft receiver, thereby greatly simplifying the laser circuitry which need be included aboard the spacecraft.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURES 1(*a*) and 1(*b*) are simplified block diagrams of prior art heterodyne type receivers;

Figure 1A:
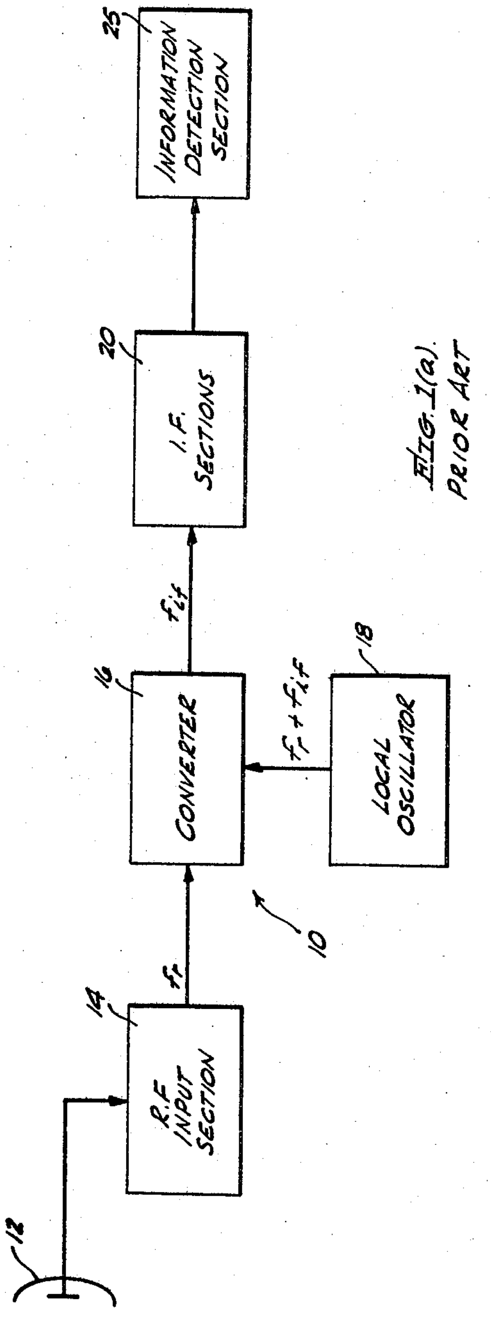
FIG. 1(a). PRIOR ART
Figure 1B:
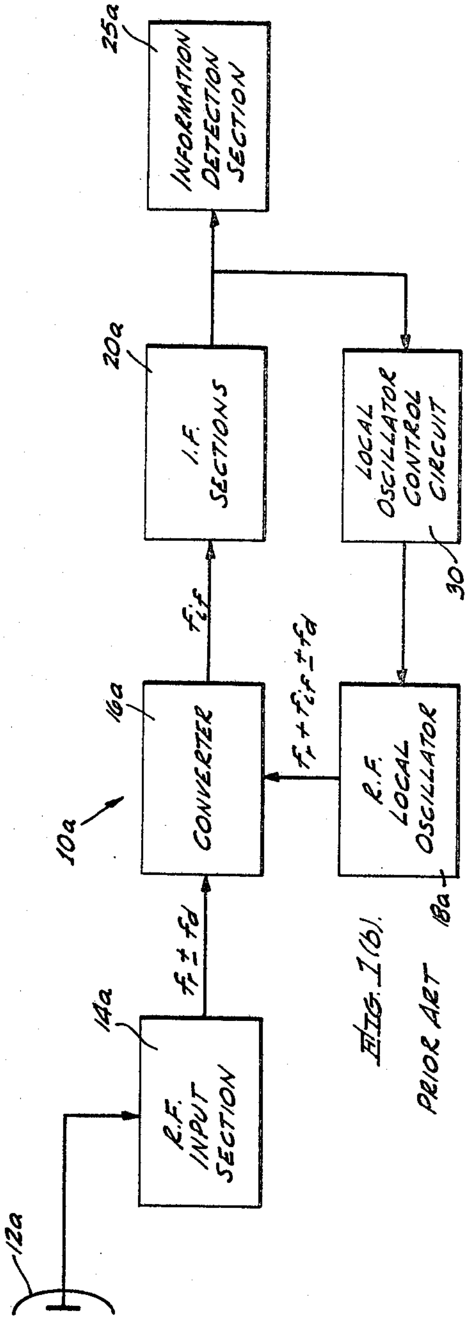
FIG. 1(b). PRIOR ART

For a complete understanding of the novel features of the present invention and the advantages thereof, attention is first directed to FIGURE 1(*a*) which is a simplified block diagram of a conventional heterodyne-type receiver. In order to simplify the following description, hereafter, instead of referring to signals of a predetermined frequency, reference will be made directly to the predetermined frequency. Also, instead of referring to a beam of a given frequency $f$, reference will be made to a beam $f$.

In FIGURE 1, a conventional heterodyne-type receiver 10 is shown coupled to a receiving antenna 12 which transfers the received frequency, designated for explanatory purposes as $f_r$, to a radio frequency (RF) input section 14. Therein, the received frequency is amplified and transferred to a converter or mixer 16 which is also supplied with a locally generated frequency from an RF local oscillator 18. Generally, the frequency of oscillator 18 is controlled to be equal to $f_r \pm f_{if}$ so that the output frequency of converter 16 is $f_{if}$, representing an intermediate frequency (IF). This IF signal is supplied to an IF section 20. Therefrom, the frequency is supplied to an information detection section 25 from which the information contained in the frequency $f_r$ received by antenna 12 and the later converted to the frequency $f_{if}$ is extracted. In the following description, it will be assumed that the output frequency of oscillator 18 is $f_r + f_{if}$ as designated in FIGURE 1(*a*).

It is appreciated by those familiar with the art that if oscillator 18 is of the fixed type, the receiver 10 can be operated satisfactorily only if the received frequency $f_r$ is fixed. If however Doppler shifts affect the received frequency $f_r$, by increasing or decreasing it due to the relative motion of the receiver with respect to a transmitter (not shown) from which frequency $f_r$ is received, then a fixed oscillator, such as oscillator 18, cannot be used. Instead, a receiver **10*a*** shown in block diagram in FIGURE 1(*b*) must be employed wherein the frequency of the RF local oscillator **18*a* is adjustable by means of a local oscillator control circuit 30, so that as the received frequency changes by $\pm f_d$, where $f_d$ represents the change in frequency produced by Doppler shifts, the frequency of the oscillator 18*a*** changes by an equal amount. In FIGURE 1(*b*), the the various elements which are similar to those incorporated in FIGURE 1(*a*) are designated by the same reference numerals with a subscript *a*.

Assuming that the received frequency is $f_r \pm f_d$ the output frequency of oscillator **18*a* is constantly adjusted to equal the received frequency plus the IF frequency. Thus, the oscillator's frequency may be designated as $f_r + f_d + f_{if}$. The frequency of oscillator 18*a* is controlled by a local oscillator control circuit 30, which is coupled to the IF section 20*a*, and which adjusts the frequency of oscillator 18*a* so that regardless of the changes in the received frequency, the frequency supplied to section 20*a*** is $f_{if}$.

Herebefore, whenever a laser, due to its high spectral purity, has been suggested for use in a communication system, the contemplated use has been for the laser to serve as a fixed local oscillator, such as oscillator 18 in FIGURE 1(*a*). In the present state of the laser art, techniques have been developed to provide a coherent stable fixed output frequency from a laser, in the optical range. Therefore, hereafter the output of the laser will also be referred to as a beam. A communication system has been suggested wherein information is radiated to a receiver from a transmitter which incorporates a laser providing a coherent stable fixed output frequency or beam, the frequency being designated as $f_o$, where the subscript *o* indicates that the frequency is in the optical range. In the receiver, a laser serving as the oscillator 18 will provide a fixed frequency $f_o + f_{if}$. An optical converter or mixer will then be used to mix the two frequencies or beams and provide the frequency $f_{if}$ to an IF section, from which the information may be extracted by techniques similar to those employed in conventional receivers.

As is appreciated by those familiar with the art of communication in general and space communication in particular, the use of a laser-produced beam which is characterized by extremely high spectral purity and high stability greatly increases the capability of communicating with far off spacecrafts. A low-noise beam from a laser in a space vehicle transmitter can be received by an accurately placed and directed receiver, so that the information in the received beam can be conveniently extracted with minimal ambiguity due to the higher signal-to-noise ratio in the received beam. However, it is appreciated that due to the high speeds of the spacecraft, the received frequency $f_o$ or beam is affected by Doppler shifts $\pm f_d$. Therefore, the use of a laser as the local oscillator of a fixed frequency in the receiver is not as advantageous as could be, since the inability to vary the frequency of the compensation laser's beam prevents the Doppler shifts in the received beam. Consequently, herebefore, in all the proposed laser communication systems, Doppler shifts have to be compensated for by additional circuitry, external to the laser. Generally, this may be accomplished by adding Doppler compensating circuitry in the radio frequency (RF) section of the receiver prior to the IF section. However, the additional circuitry, in addition to being expensive and complex, increases the noise in the system and therefore complicates the task of extracting the received information. It is to alleviate this problem, by providing a laser communication system in which Doppler shifts are compensated for in the laser, that one aspect of the present invention is directed.

Figure 2:
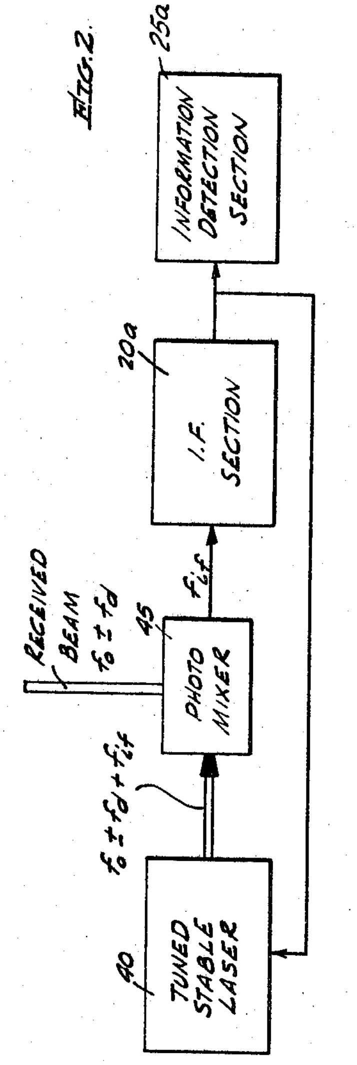
FIGURE 2 is a simplified block diagram of a heterodyne type receiver with the novel tuned stable laser of the present invention.

Referring to FIGURE 2, there is shown a heterodyne-type receiver which operates in a manner similar to that of the receiver shown in FIGURE 1(*b*). However, whereas in the receiver shown in FIGURE 1(*b*), the output frequency of RF local oscillator 18*a* is adjusted by means of control circuit 30 to compensate for the Doppler shifts $\pm f_d$ of the received frequency, in the receiver of FIGURE 2, such compensation is accomplished by a tuned stable laser 40. The laser produces a continuously adjustable frequency or beam which when mixed in an optical or photo mixer 45 with a received beam, the output of the mixer is a frequency $f_{if}$, containing the information transmitted to the receiver.

As will be described hereinafter in detail, the frequency of the laser's beam is adjusted or tuned by subjecting the laser to a magnetic field which shifts the frequency of the emission spectrum therein in accordance with the well known Zeeman effect. Therefore, hereafter, the laser 40 will also be referred to as the Zeeman tuned stabilized laser. Assuming that the frequency of the received beam is $f_o \pm f_d$, the laser 40 is coupled to the IF section 20 which controls the output frequency or beam of the laser assembly 40 to be equal to $f_o \pm f_d + f_{if}$, so that when mixed in mixer 45, the mixer's output is $f_{if}$. In FIGURE 2 and the following figures, double lines represent optical frequencies or beams.

Figures 3, 4:
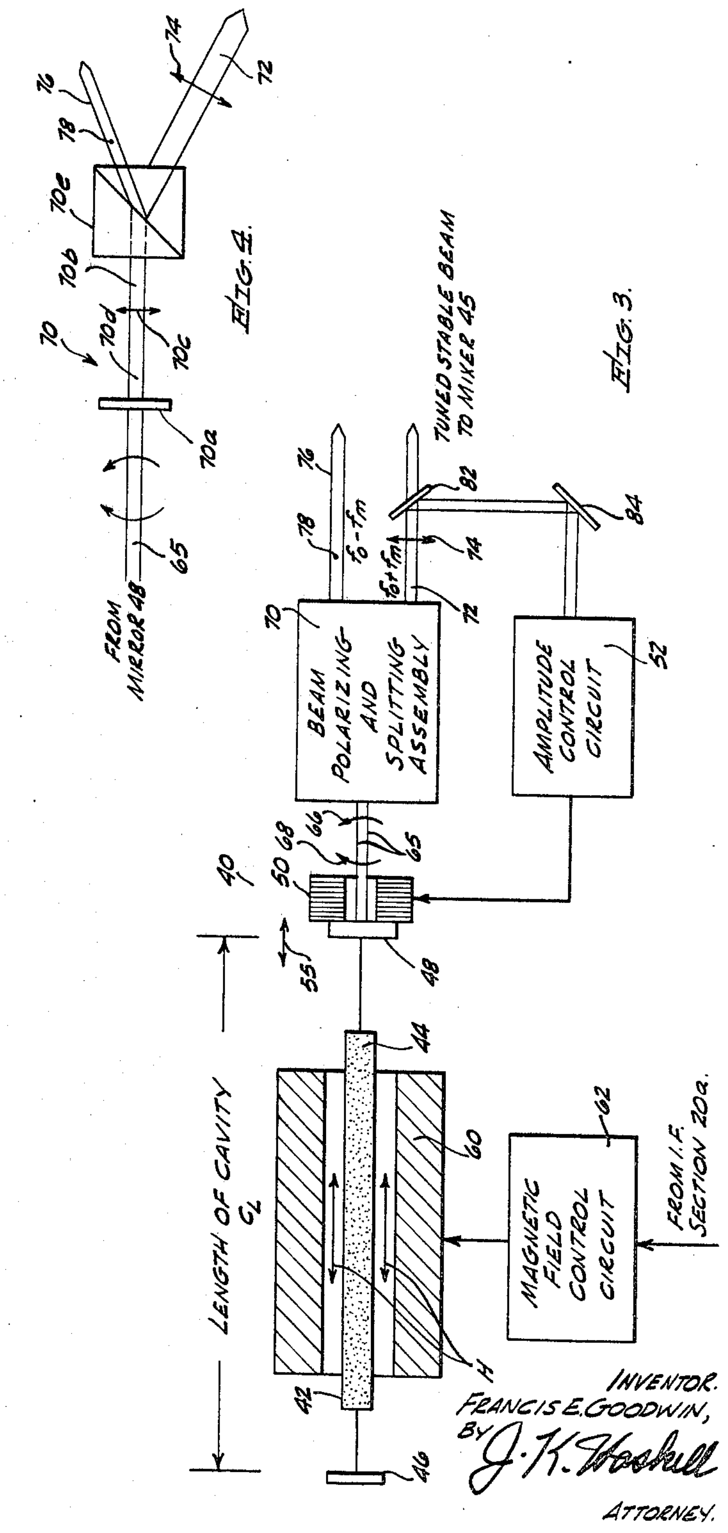
FIGURE 3 is a block diagram of one embodiment of the tuned stable laser of the invention.
FIGURE 4 is a block diagram of one of the assemblies of FIGURE 3.

Attention is now directed to FIGURE 3 which is a block diagram of the Zeeman tuned stable laser 40. Basically, it comprises some elements which are included in a conventional stable laser such as a discharge tube 42, filled with an ionized gas 44 and a pair of mirrors 46 and 48. The spacing between the mirrors defines the length $C_L$ of the cavity of the laser. As is well known by those familiar with present-day lasers, when a given ionized gas in the tube is properly pumped by means of a pumping source (not shown), populations may be raised to higher energy levels, thus producing a population inversion. When the excited populations are returned to their quiescent energy levels, the energy which they lose is related to the frequency of the light which they emit, the frequency being one of the emission spectral lines of the gas. By controlling the length $C_L$ of the cavity to be equal to an integer number of a half wavelength of the particular light, the laser will produce a stable output frequency at a relative constant peak amplitude.

Since, due to environmental conditions, such as temperature, the effective length of the cavity changes, prior art techniques have been developed to automatically vary the length of the cavity, so that the amplitude and frequency of the output beam remain constant. One technique employs a piezoelectric transducer 50 on which mirror 48 is mounted. The piezoelectric transducer is in turn coupled to an amplitude control circuit 52 which senses the amplitude of the output beam. Circuit 52 energizes the piezoelectric transducer 50 to vary the relative position of mirror 48 in the directions indicated by double-headed arrows 55 in order to optimize its distance from mirror 46 to be an integer multiple of half wavelength of the output beam, so that the amplitude of the beam remains relatively constant. Such a technique is used in present-day stable lasers, several of which are commercially available.

The Zeeman tuned stable laser of the present invention, in addition to the elements herebefore described, includes an electromagnetic element 60 such as a magnetic coil wound about the discharge tube 42. The element 60 is connected to a magnetic field control circuit 62 which supplies the element with a controlled current, the magnitude and polarity of which control the respective magnitude and polarity of the magnetic field which is produced by element 60 about the discharge tube 42. In FIGURE 3, the double-headed arrows designated by the letter H indicate the direction of the magnetic field created by element 60 about the tube 42.

From quantum mechanics and atomic physics, it should be appreciated that due to the Zeeman effect which briefly stated represents a change in frequency of light which is subjected to a magnetic field, the frequency of the beam produced by the laser shown in FIGURE 3 may be changed as a function of the magnetic field. Assuming that in the absence of the magnetic field, the beam's frequency is $f_o$, the magnetic field changes the frequency $f_o$, the magnitude of change being a function of the magnitude of the magnetic field. Furthermore, from quantum mechanics, it should be appreciated that due to the magnetic field the electrons placed therein will assume two states, so that in essence the beam of frequency $f_o$ will be split into two superimposed beam of frequencies $f_o + f_m$ and $f_o - f_m$, where $f_m$ represents the shift in frequency caused by the magnetic field. Also one of the beams will be right circularly polarized and the other will be left circularly polarized. In FIGURE 3, double lines 65 represent the composite beam radiating from the cavity through the transducer 50. Arrows 66 and 68 indicate that the composite beam comprises two frequencies, one of which is right circularly polarized and the other left circularly polarized, respectively.

In accordance with the teachings of the present invention, the composite beam is supplied to a beam splitting and polarizing assembly 70 which first polarizes the circularly polarized beams into two mutually perpendicular linearly polarized beams and then separates the two linearly polarized beams into a beam 72 of frequency $f_o + f_m$, linearly polarized in the direction indicated by arrow 74 and a second beam 76 of frequency $f_o - f_m$, linearly polarized in a perpendicular direction (to arrow 74) indicated by dot 78. Thus, the output of assembly 70 comprises two separate beams (72 and 76), the frequency of each differing by an equal amount from the frequency $f_o$ produced by the laser when the magnetic field is zero.

From the foregoing, it is appreciated that in order for the beam to be stable, it is necessary to tune the cavity to be any integer of half wavelengths of its frequency. This may be conveniently accomplished by reflecting a small portion of one of the beams, such as beam 72, to the amplitude control circuit 52 by means of mirrors 82 and 84. In practice, the amplitude of beam 72 is constantly sampled and in response thereto, transducer 50 is activated to move mirror 48 with respect to mirror 46 in order to adjust the cavity's length $C_L$ to be an integer multiple of half wavelengths of a beam having a frequency $f_o + f_m$, thereby stabilizing the amplitude of beam 72 at a peak value. Thus, it is seen that the Zeeman tuned stable laser shown in FIGURE 3 produces a stable beam of a frequency $f_o + f_m$, where $f_m$ is a function of the magnetic field which is controlled by the current from magnetic field control circuit 62.

When incorporating the Zeeman tuned stable laser 40 in a heterodyne-type receiver with Doppler shifts, such as the arrangement of FIGURE 2, the magnetic field control circuit 62 is coupled to the IF section 20*a* and the beam 72 is supplied to the photo mixer 45. The magnetic field control circuit is energized as a function of the frequency supplied to the IF section 20*a* to energize the electromagnetic element 60 to produce a field which causes the frequency of beam 72 to be substantially equal to the frequency of the received beam plus the IF frequency. Assuming that the received beam is of a frequency $f_o+f_d$, the control circuit 62 is adjusted to control the magnetic field so that the frequency of beam 72 is about $f_o+f_d+f_{if}$. Consequently, when the two beams are mixed in photo mixer 45, the output is $f_{if}$ or within the bandwidth of section 20*a*.

From the foregoing, it should thus be apparent that in the embodiment of the invention diagrammed in FIGURE 2, the tuned stable laser 40 does not provide a fixed frequency or beam. Rather, its output frequency or beam is continuously tunable to compensate for any Doppler shifts in the received beam so that the two beams can be mixed directly to provide the intermediate frequency $f_{if}$, from which information is extracted. Thus the need for Doppler shift compensating circuitry external to the laser is eliminated. This greatly improves the overall performance of the receiver since it simplifies the problem of Doppler compensation and reduces the cost and complexity thereof, as well as increases the signal-to-noise ratio of the receiver.

Attention is now directed to FIGURE 4 which is one embodiment of the beam splitting and polarizing assembly 70. Basically, the assembly is shown comprising a quarter wavelength plate 70*a*, the function of which is to convert the right circularly and left circularly polarized beams of the composite beam 65 into mutually perpendicular linearly polarized beams of a composite beam 70*b*. The mutually perpendicular directions of linear polarization are represented by arrow 70*c* and dot 70*d*. Therefrom, the composite beam 70*b* passes through a Wollaston-type prism 70*e*, wherein the composite beam 70*b* is split into beams 72 and 76, beam 72 being linearly polarized in the direction indicated by arrow 74 and beam 76 being linearly polarized in a perpendicular direction indicated by dot 78. It should be appreciated that other known optical techniques may be employed to split a composite beam with right and left circularly polarized components, such as beam 65, into two separate mutually perpendicular linearly polarized beams, such as beams 72 and 76.

Various presently known control circuit techniques may be employed to implement control circuits 52 and 62. Basically control circuit 52 may be thought of as an amplitude sensitive closed-loop servo system which senses the amplitude of beam 72 and adjusts the position of mirror 48, so as to optimize the amplitude of the beam. Similarly, the control circuit 62 may be thought of as a frequency sensitive closed-loop servo system which is energized to provide a magnetic field so that the frequency of the laser is such that when mixed with the Doppler shifted received beam, the output frequency of the mixer 45 (FIGURE 2) is $f_{if}$ or within the bandwidth of the IF section 20*a*. Servo systems used to control signal amplitudes or frequencies are extensively used in the art, and therefore the specific embodiments of circuits 52 and 62 are not described.

From the foregoing, it should thus be appreciated that in accordance with the teachings disclosed herein, a novel laser is provided. The laser provides a stable frequency or beam which is controllable or tunable to vary from a known frequency ($f_o$) as a function of a controllable magnetic field in which the discharge tube of the laser is placed. The change in frequency is produced in accordance with the Zeeman effect which relates to changes in frequency of light subjected to a magnetic field. When used in a heterodyne-type receiver in which the received frequency is subject to Doppler shifts, the novel tuned stable laser of the present invention can be used to provide a stable frequency which compensates for these shifts so that the laser's frequency is at all times a function of the Doppler shifted received frequency and the intermediate frequency (IF) of the receiver. Thus the tuned stable laser directly compensates for Doppler shifts.

With present-day laser technology, the Zeeman tuned stable laser of the invention may conveniently be incorporated in any ground receiving station of a communication system, such as a space communication system. However, its use in a spacecraft may be more complex. This is primarily due to the fact that at present, using a stable laser of a fixed frequency in a spacecraft results in many complex technical problems, which are further complicated if the stable laser is to be tuned.

Figure 5:
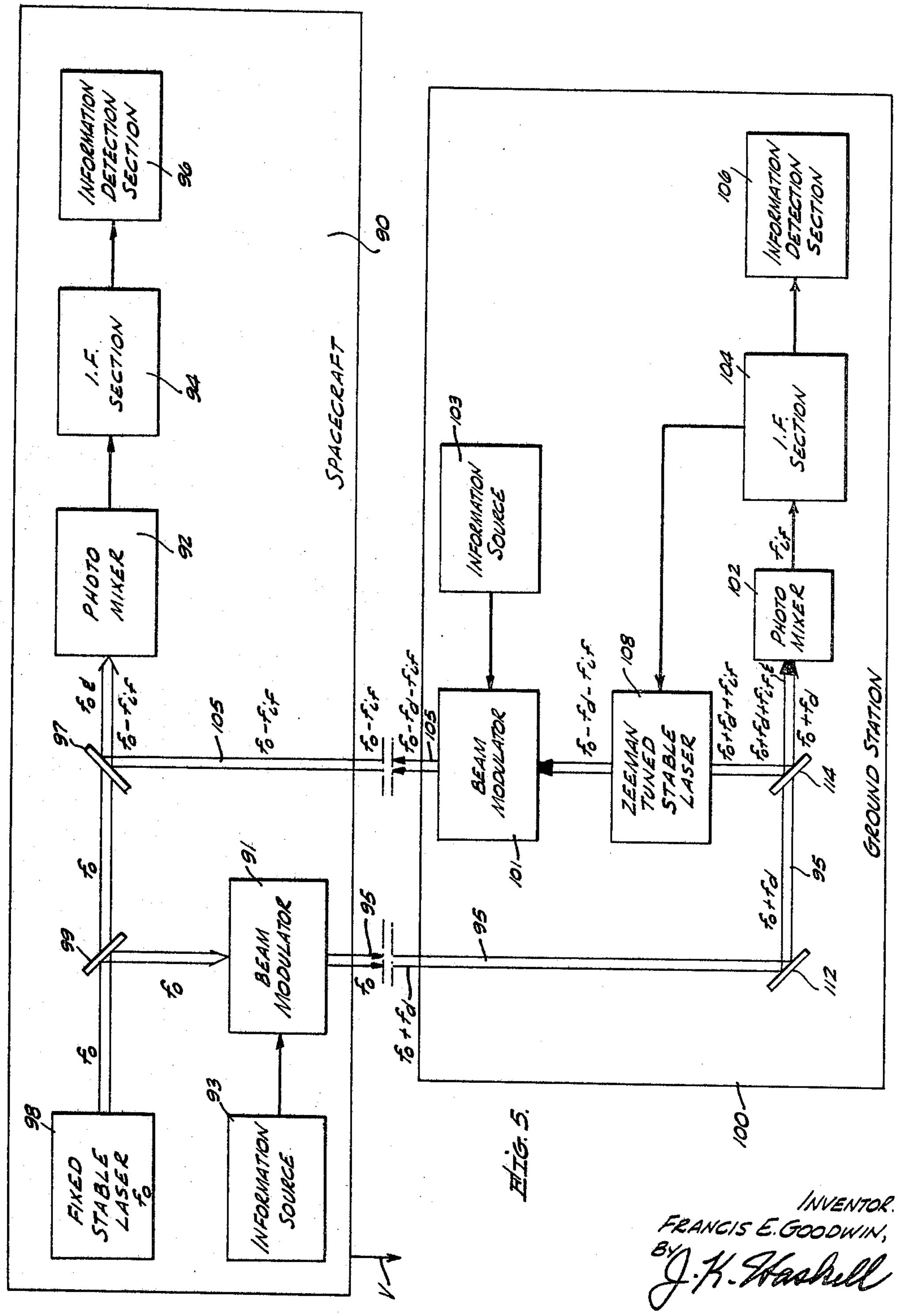
FIGURE 5 is a block diagram of a two-way heterodyne space communication system with the novel tuned stable laser of the invention providing bilateral Doppler compensation.

To eliminate the need for tuning the frequency of a stable laser in a spacecraft receiver in order to compensate for Doppler shifts in the frequencies transmitted thereto from a ground station transmitter, the present invention includes another embodiment which is diagrammed in FIGURE 5 to which reference is made herein. As seen, the communication circuitry in the spacecraft which is enclosed in block 90 comprises a photo mixer 92, an IF section 94, and an information detection section 96 which operate in a manner as herebefore described. The ground station circuitry enclosed in block 100 similarly includes a photo mixer 102, an IF section 104, and an information detection section 106. However, whereas the ground station includes a Zeeman tuned stable laser 108, the laser in the spacecraft is a fixed stable laser 98 providing a beam of a fixed frequency $f_o$. The laser 108 on the other hand is controlled to provide two frequencies or beams which differ by $f_d+f_{if}$ from the frequency $f_o$. Namely, one beam has a frequency $f_o+f_d+f_{if}$ and the other has a frequency $f_o-f_d-f_{if}$. The novel technique whereby the two beams are produced by laser 108 will be described hereafter in detail.

In practice, a portion of the beam $f_o$ produced in the spacecraft by laser 98 is utilized in a spacecraft transmitter which may include a beam modulator 91, wherein the beam is modulated according to information to be sent to the ground station supplied from an information source 93. Then, the information modulated beam $f_o$ designated in FIGURE 5 by reference numeral 95, is beamed toward the ground station. Assuming that the spacecraft 90 moves towards the ground station as indicated by arrow V, Doppler shifts $f_d$ increase the frequency of the beam 95 from the spacecraft from frequency $f_o$ to a frequency $f_o+f_d$. In the ground station receiver, the beam 95 is reflected by a mirror 112 to the photo mixer 102 through a mirror 114. Also, the beam $f_o+f_d+f_{if}$ produced by the Zeeman tuned stable laser 108 is reflected by mirror 114 to the same mixer, the output frequency of which is the difference between the two beams, i.e. $f_{if}$. This frequency is then supplied to the IF section 104 and therefrom to the information detection section 106 wherein the information transmitted from the spacecraft is extracted or detected.

In accordance with the teachings of the invention, the second beam, produced by the Zeeman tuned stable laser 108, namely, the beam of an $f_o-f_d-f_{if}$ is modulated in a beam modulator 101 according to information to be transmitted to the spacecraft from a ground station information source 103. Thereafter, the information-containing beam designated by numeral 105 is beamed toward the spacecraft receiver. As the beam travels toward the spacecraft which is moving toward the ground station, the frequency of the beam 105 increases by the Doppler shift $f_d$, so that when it arrives at the spacecraft, its frequency is increased to $f_o-f_{if}$. Therein, the received beam is reflected by mirror 97 to the photo mixer 92. Simultaneously, a portion of the beam $f_o$ from the fixed stable laser 98 is directed through mirrors 99 and 97 toward the mixer 92 which produces a difference frequency $f_{if}$. The intermediate frequency $f_{if}$ is supplied to the IF section 94 and therefrom to section 96 wherein the information transmitted to the spacecraft is extracted.

In addition to the foregoing described circuits, the IF section 104 is connected to the Zeeman tuned stable laser 108 in order to control the frequencies of the pair of beams produced thereby. Basically, the frequencies of the beams are controlled so that the frequency of the signals from mixer 102 is substantially equal to $f_{if}$ or within the bandwidth of section 104. This is done by adjusting the frequency component $f_d$ of the beam $f_o+f_d+f_{if}$ to equal the frequency shift of beam 95, i.e., $f_d$ which is produced by the Doppler shifts, so that the difference of the frequencies of beams $f_o+f_d+f_{if}$ and $f_o+f_d$ supplied to mixer 102 is $f_{if}$. Once this is accomplished, the $f_d$ component of the beam of frequency $f_o-f_d-f_{if}$, i.e. beam 105 is also equal to the same frequency shift, so that when beam 105 arrives at the spacecraft its frequency is $f_o-f_{if}$. Consequently, it can be directly combined with the beam of frequency $f_o$ from stable laser 98 to produce signals of the intermediate frequency $f_{if}$ from which the information from the ground station is extracted. By tuning laser 108 all Doppler shifts in the beams from and to the spacecraft are compensated, so that the lased in the spacecraft can be of the type providing a beam of a fixed stable frequency.

From the foregoing, it should thus be appreciated that in accordance with the novel aspects of the present invention, a laser communication system is provided wherein all Doppler shifts are compensated by the laser in ground station, the laser being tunable and stable as herebefore described. Since the receivers in both the ground station and the spacecraft are of the heterodyne type, the system can be thought of as a two-way heterodyne communication system with bilateral Doppler compensation using a single Zeeman tuned stable laser. Bilateral Doppler compensation refers to the Doppler shifts in the beam transmitted to the ground and the one transmitted therefrom. It is seen from the foregoing, that even though all Doppler shifts are compensated for, the laser 98 in the spacecraft is of the fixed stable type which does not require continuous tuning. This aspect is particularly significant since it greatly simplifies the task of implementing the system. Fixed stable lasers are commercially available and laser technology has developed to the point where such a laser can be mounted to operate satisfactorily in a spacecraft.

It is appreciated that for the novel embodiment of the invention described in conjunction with FIGURE 5, it is necessary that the Zeeman tuned stable laser 108 produce two stable beams of frequencies $f_o+f_m$ and $f_o-f_m$ where $f_o$ is the frequency of the fixed stable laser 98 in the spacecraft and $f_m=f_d+f_{if}$ where $f_d$ is the change in frequency caused by Doppler shifts and $f_{if}$ is the system's intermediate frequency. From the foregoing description in conjunction with FIGURE 3, it should be recalled that in the Zeeman tuned stable laser of the present invention, the output of the beam polarizing and splitting assembly 70 comprises two beams of frequencies $f_o+f_m$ and $f_o-f_m$. However, in the foregoing description, it has been assumed that the length of the cavity $C_L$ is controlled to be an integer multiple of half wavelengths of beam $f_o+f_m$ so that only that beam is stable. It should be appreciated, however, by those familiar with the art that if the length of the cavity is made to assume two apparent lengths, each related to half wavelengths of another of the two beams, the Zeeman tuned stable laser would indeed produce two stable beams $f_o+f_m$ and $f_o-f_m$.

Figure 6:
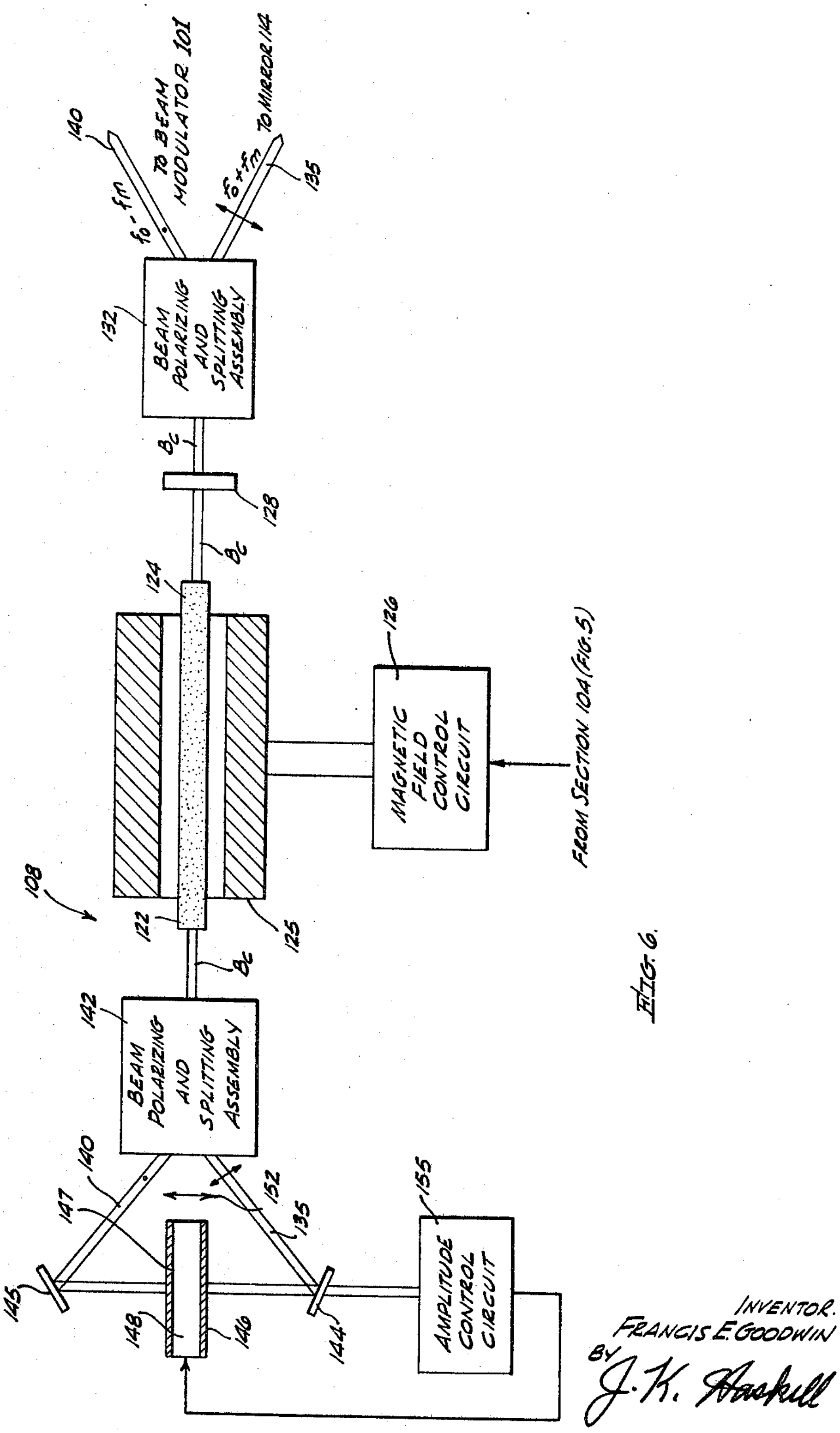
FIGURE 6 is another embodiment of the novel tuned stable laser of the invention for providing two tuned stable beams.

One arrangement for controlling the cavity of the Zeeman tuned stable laser to assume two apparent lengths is diagrammed in FIGURE 6 to which reference is made herein. The arrangement is assumed to represent the Zeeman tuned stable laser 108 shown in FIGURE 5. The laser includes a discharge tube 122, filled with an ionized gas 124 and an electromagnetic element 125 disposed about the tube to subject the gas to a magnetic field which is controlled by control circuit 126. A fixed mirror 128 is disposed with respect to one end of the tube 124, so that when laser action takes place, a composite beam $B_C$ comprising two components of frequencies $f_o+f_m$ and $f_o-f_m$ is directed therethrough to a beam polarizing and splitting assembly 132. Therein, the two components which are right and left circularly polarized are linearly polarized into two mutually perpendicular directions. Then, the two components of the two different frequencies are split into two separate beams 135 and 140. Beam 135 is of a frequency $f_o+f_m$ while the frequency of beam 140 is $f_o-f_m$.

In order, however, for the two beams to be stable, it is necessary to control the cavity to have two apparent different lengths as a function of the wavelengths of the two beams. This may be accomplished by disposing a second beam polarizing and splitting assembly 142 with respect to the other end of tube 122, the function of which is to split beam $B_C$ into the two separate beams 135 and 140 as is done by assembly 132 at the other end of tube 122. The beams 135 and 140 from assembly 142 are directed by means of mirrors 144 and 145 respectively to mirrors 146 and 147 mounted on opposite sides of piezoelectric transducer 148.

Since the beams 135 and 140 are directed from assembly 142 to the mirorrs mounted on transducer 148 along different paths, the effective length of the cavity for each of the beams is different. For beam 135 of frequency $f_o+f_m$, the length of the cavity is the distance from mirror 128 to mirror 146 while for beam 140 of frequency $f_o-f_m$, the cavity's length is from mirror 128 to mirror 147. Thus, by controlling the relative position of transducer 148 in the direction indicated by double-headed arrow 152, the effective lengths of the cavity can be adjusted to correspond to an integral multiple of half wavelengths of the frequencies of beams 135 and 140. This is accomplished by directing through mirror 144, a portion of beam 135 to an amplitude control circuit 155, the function of which is to optimize the amplitude of beam 135 by adjusting the position of transducer 148 and mirror 146 mounted thereon. Since the beams 135 ($f_o+f_m$) and 140 ($f_o-f_m$) differ from the frequency $f_o$ by equal amounts, when the mirror 146 is appropriately positioned to optimize the amplitude of beam 135, the distance between mirrors 128 and 147 will be an integer multiple of half wavelength of the frequency $f_o-f_m$ so that beam 40 will similarly be in a stable condition. Thus, the output of the arrangement comprises two stable beams of frequencies $f_o+f_m$ and $f_o-f_m$.

When used in a two-way heterodyne communication system with bilateral Doppler compensation the frequency $f_m$ is controlled, by means of the intensity and direction of the magnetic field, to be equal to $f_d+f_{if}$ so that the frequencies of the two beams are $f_o+f_d+f_{if}$ and $f_o-f_d-f_{if}$. These beams, together with the fixed stable frequency $f_o$ produced by the laser in the spacecraft, can then be used to communicate with the spacecraft while continuously compensating for Doppler shifts produced by the fast moving craft.

There has accordingly been shown and described herein a novel tuned stable laser capable of providing a stable beam, the frequency of which is controllable as a function of control signals. One use of such a tuned stable laser has been described in conjunction with a heterodyne-type receiver wherein the frequency of the beam is continuously adjusted to compensate for Doppler shifts in the received beam. Another embodiment of the invention comprises a novel tuned stable laser which provides two stable beams, the frequencies of which are controllable so that the frequency of one beam is higher by a controlled amount from a predetermined frequency while the frequency of the other beam is lower by the same controlled amount from the predetermined frequency. Such a unique capability particularly adapts the tuned stable laser to be used in the ground station of a communication system with a spacecraft, herebefore described, so that a stable laser of a fixed frequency may be used in the spacecraft, thereby greatly simplifying the complexity of the system and increasing its reliability.

It should be appreciated that those familiar with the art may make modifications in the arrangements as shown without departing from the true spirit of the invention. Therefore, all such modifications and/or equivalents are deemed to fall within the scope of the invention as claimed in the appended claims.

What is claimed is:

1. In combination with a stable laser including cavity defining means and means for providing a stable beam of a frequency $f_o$ by controlling the spacing between said cavity defining means as a function of said $f_o$ frequency, an arrangement for tuning said stable laser to provide a first stable beam of a frequency $f_o+f_m$ and a second stable beam of a frequency $f_o-f_m$, the arrangement comprising:

means for providing a magnetic field about said stable laser;

means for controlling the characteristics of said magnetic field to provide a first beam of a frequency $f_o+f_m$ and a second beam of a frequency $f_o-f_m$; and stabilizing means for controlling the spacing between said cavity defining means as a function of at least one of said first and second beams to provide a first stable beam of a frequency $f_o+f_m$ and a second stable beam of a frequency $f_o-f_m$, $f_m$ being a function of the intensity of said magnetic field.

2. In combination with a stable laser, the arrangement defined in claim 1 wherein said magnetic field converts the stable beam of said laser into a composite beam comprising a first beam of a frequency $f_o+f_m$ and a second beam having a frequency $f_o-f_m$, said first and second beams being polarized in opposite directions, said arrangement including beam splitting means for separating said first beam from said second beam.

3. The arrangement defined in claim 2 wherein said cavity-defining means include a fixed mirror and beam reflecting means disposed from said fixed mirror, said beam reflecting means being responsive to signals from said stabilizing means to provide a first stable beam of a frequency $f_o+f_m$ and a second stable beam of a frequency $f_o-f_m$ by controlling the spacing between said beam reflecting means and said mirror to be a function of the frequencies $f_o+f_m$ and $f_o-f_m$.

4. The arrangement defined in claim 3 wherein said beam reflecting means comprise a piezoelectric transducer having first and second sides, a first mirror mounted on said first side for reflecting said first beam toward said fixed mirror and a second mirror mounted on the second side of said transducer for reflecting said second beam toward said fixed mirror.

5. In combination with a stable laser including a selected material means for energizing said material to produce a beam of light of a predetermined frequency $f_o$, an arrangement for converting said stable beam of light of the frequency $f_o$ into two stable beams of light of frequencies $f_o+f_m$ and $f_o-f_m$, the arrangement comprising:

means for providing a magnetic field about said material to provide a composite beam of light comprising a first beam of light of a frequency $f_o+f_m$ and a second beam of light of a frequency $f_o-f_m$, said first and second beams of light being polarized in opposite circular directions;

means for separating said first beam from said second beam;

cavity defining means comprising a fixed mirror and a selectively positionable mirror assembly disposed from said fixed mirror, said mirror assembly and said fixed mirror defining a composite cavity having effectively first and second lengths;

amplitude sensing means responsive to at least one of said first and second beams for controlling the first length of said composite cavity as a function of an integer multiple number of half wavelengths of said first beam of light of the frequency $f_o+f_m$ and for controlling the second length of said composite cavity as a function of an integer multiple number of half wavelengths of said second beam of light of the frequency $f_o-f_m$; and means for controlling the intensity of said magnetic field to control the frequency component $f_m$ of the frequencies $f_o+f_m$ and $f_o-f_m$.

6. The arrangement defined in claim 5 wherein said mirror assembly comprises a pizeoelectric transducer having first and second substantially flat surfaces, a first mirror mounted on said first surface and a second mirror mounted on said second surface, the optical path between said first mirror and said fixed mirror defining the first length of said composite cavity, and the optical path between said second mirror and said fixed mirror defining the second length of said composite cavity, said piezoelectric transducer being responsive to signals from said amplitude sensing means for selectively varying the position thereof to control the first and second lengths of said composite cavity.

7. The arrangement defined in claim 6 further including means for reflecting said first beam between said first mirror and said fixed mirror and for reflecting said second beam between said second mirror and said fixed mirror.

8. The arrangement defined in claim 7 wherein said means for separating said first beam from said second beam includes polarizing means for linearly polarizing said composite beam of light comprising said first beam and said second beam in two mutually perpendicular directions and prism means for separating said first and second beams linearly polarized in two mutually perpendicular directions from one another.

9. The arrangement defined in claim 8 wherein said polarizing means comprise a quarter waveplate and said prism means is a Wollaston type prism.

10. In a two-way heterodyne communication system wherein information-containing signals from a first station are received in a first receiver in a second station and information-containing signals from the second station are received in a second receiver in the first station, each receiver including means for converting the frequency of the information-containing signals received therein to an intermediate frequency $f_{if}$ and information detection means for detecting the information from the signals of said intermediate frequency, the improvement comprising:

a stable laser for providing a stable beam of a fixed frequency $f_o$ in said first station;

a tunable stable laser for providing a pair of stable beams of frequencies $f_o+(f_m+f_{if})$ and $f_o-(f+f_{if})$ in said second station;

means in said first station for directing information to the second receiver in said second station in the stable beam of frequency $f_o$;

means in said second receiver for receiving the information-containing beam from said first station;

mixing means in said second receiver for mixing the information-containing beam from said first station and one of said pair of stable beams to provide information containing signals at a frequency which is a function of the difference between the frequencies of the beams mixed therein;

means in said second station for directing information to said first receiver in said first station in the other of said pair of stable frequencies;

means in said first receiver for receiving the information-containing beam directed thereto from said second station;

mixing means in said first receiver for mixing the information-containing beam received from said second station with the stable laser in said first station to provide information-containing signals at a frequency related to the frequencies of the two beams mixed therein;

frequency control means in said second receiver responsive to the frequency of the signals produced by the mixing means in said second receiver for adjusting the frequencies of said pair of beams provided by said tunable stable laser so that the frequencies of the information-containing signals produced by the mixing means in said first and second receivers are substantially equal to the intermediate frequency $f_{if}$; and information detection means in each of said receivers for detecting the information contained in the signals from the mixing means in said receiver.

11. The improvement defined in claim 10 wherein the frequencies of the information-containing beams received by said receivers vary as a function of Doppler shifts produced by the relative motions of the first and second stations with respect to one another, said frequency control means adjusting the frequencies of said pair of beams from said tunable stable laser to compensate for said Doppler shifts.

12. In a two-way heterodyne space communication system for communicating information between a spacecraft and a ground station with beams of frequencies in the optical range, the system including a spacecraft receiver for receiving an information-containing beam from the ground station and detecting the information therefrom, the system further including a ground receiver for receiving an information-containing beam from said spacecraft and detecting the information therefrom, each of said receivers including a beam source for providing a locally generated beam and means for mixing the information-containing beam received thereby with said locally generated beam to provide information containing signals at an intermediate frequency, $f_{if}$, the frequencies of the information-containing beams transmitted to said spacecraft and ground station receivers varying as a function of Doppler shifts produced by the motion of said spacecraft with respect to the ground station, the improvement comprising:

a stable laser in said spacecraft for providing a stable beam of a fixed frequency $f_o$;

means for containing information in a portion of said beam of the frequency $f_o$;

means for directing said information containing beam of frequency $f_o$ to said ground station, the frequency of said beam varying as a function of the Doppler shifts;

a tunable stable laser in said ground station for providing a pair of stable beams of frequencies $f_o+(f_d+f_{if})$ and $f_o-(f_d+f_{if})$;

first mixing means for mixing the information-containing beam from said spacecraft with one of said beams from said tunable stable laser to provide information containing signals at a frequency which is a function of hte difference of the frequencies of the mixed beams;

frequency tuning means responsive to the frequency of the signals from said first mixing means for controlling the frequency $f_d$ to equal the frequency shift produced by said Doppler shift so as to control the frequency of the signals provided by said first mixing means to be substantially equal to $f_{if}$;

means for containing information in the other of said pair of beams provided by said tunable stable laser;

means for receiving the said other information containing beam in said spacecraft;

means for mixing said other information-containing beam with a portion of the beam of frequency $f_o$ produced by said stable laser in said spacecraft to provide signals of said intermedite frequency $f_{if}$; and information detection means responsive to signals of said intermediate frequencies for extracting the information contained therein.

13. In a stable laser wherein matter provides a beam of light at a predetermined frequency, said laser including stabilizing means for stabilizing the amplitude of said beam by controlling the length of the cavity of said laser as a function of said predetermined frequency of length of said cavity being defined as the distance between a first reflecting surface and a second surface controllably positionable with respect to said first surface, an arrangement for tuning the frequency of said beam of light from said predetermined frequency to a tuned frequency, the arrangement comprising:

means for subjecting said beam of light of said predetermined frequency to a magnetic field to vary the frequcncy of said beam of light from said predetermined frequency as a function of the characteristics of said magnetic field;

means for controlling the characteristics of said magnetic fields to control the change in the frequency of said beam of light from said predetermined frequency to a tuned frequency; and beam stabilizing means for stabilizing said beam of light by controlling the distance between said first and second surfaces as a function of said tuned frequency.

14. In a stable laser wherein matter provides a beam of light at a predetermined frequency, said laser including stabilizing means for stabilizing the amplitude of said beam by controlling the length of the cavity of said laser as a function of said predetermined frequency the length of said cavity being defined as the distance between a first reflecting surface and a second surface controllably positionable with respect to said first surface, an arrangement for tuning the frequency of said beam of light from said predetermined frequency to a tuned frequency, the arrangement comprising:

means for providing a magnetic field about said beam of light for converting said beam into a composite beam comprising first and second beam components polarized in opposite directions said first beam component having a frequency $f_o+f_m$ and said second beam component having a frequency $f_o-f_m$, $f_o$ being said predetermined frequency and the magnitude of $f_m$ being a function of the magnitude of said magnetic field;

means for separating said first beam component from said second beam component;

means responsive to one of said beam components for controlling the effective length of said laser cavity as a function of the frequency of said one beam component to provide a stable beam of light at the frequency of said one beam component; and means for controlling said magnetic field to control the frequency represented by $f_m$ so as to control the frequency of said stable beam.

15. In a heterodyne-type receiver for receiving from a distant source information-containing signals of a frequency in the optical range, said frequency varying as a function of Doppler shifts produced by the relative motion of said receiver with respect to said source, the improvement comprising:

a stable laser having a gaseous laser medium for providing local oscillator signals;

optical mixing means for mixing said information-containing signals and said local oscillator signals to provide intermediate frequency signals containing the same information as said information-containing signals;

means for detecting information contained within said intermediate frequency signals;

magnetic field producing means for subjecting the gas within said gaseous laser medium to a magnetic field to vary the frequency of said local oscillator signals so that the frequency of said intermediate frequency signals is substantially equal to a predetermined intermediate frequency irrespective of the changes in the frequency of said information-containing signals; and means for controlling said magnetic field providing means.

References Cited

UNITED STATES PATENTS 3,170,122 2/1965 Bennett ---------- 250—199

OTHER REFERENCES

J. R. McDermott, Space and Aeronautics, Transmitters and Receivers for Optical Communication, June 1963, pp. 98—106.

ROBERT L. GRIFFIN, Primary Examiner

A. J. MAYER, Assistant Examiner

U.S. Cl. X.R.

331—94.5; 332—7.51

UNITED STATES PATENT OFFICE
CERTIFICATE OF CORRECTION

Patent No. 3,482,099 December 2, 1969

Francis E. Goodwin

It is certified that error appears in the above identified patent and that said Letters Patent are hereby corrected as shown below:

Column 2, line 14, "as" should read -- or --. Column 4, line 40, "$f_r+f_d+f_{if}$" should read -- $f_r \pm f_d+f_{if}$ --. Column 6, line 35, "beam" should read -- beams --. Column 9, line 25, "lased" should read -- laser --. Column 10, line 48, "40" should read -- 140 --. Column 12, line 59, "$f_o-(f+f_{if})$" should read -- $f_o-f(f_m+f_{if})$ --. Column 13, line 64, "hte" should read -- the --.

Signed and sealed this 23rd day of June 1970.

(SEAL)
Attest:

Edward M. Fletcher, Jr.
Attesting Officer

WILLIAM E. SCHUYLER, JR.
Commissioner of Patents